UNITED STATES PATENT OFFICE.

GÉZA AUSTERWEIL, OF NEUILLY, NEAR PARIS, FRANCE.

PROCESS OF MAKING BORNEOL AND BORNEOL ESTERS FROM PINENE.

986,038. Specification of Letters Patent. Patented Mar. 7, 1911.

No Drawing. Application filed November 11, 1908. Serial No. 462,024.

*To all whom it may concern:*

Be it known that I, GÉZA AUSTERWEIL, chemist, subject of the King of Hungary, residing at Neuilly, near Paris, 118 Boulevard Bineau, in the Republic of France, have invented certain new and useful Improvements in an Improved Process for Making Borneol and Borneol Esters from Pinene, of which the following is a full, clear, and exact description.

The present methods of converting pinene, by hydration, into alcohols of the pentocean series are based on the processes of Bouchardat and Lafont, as described in *Comptes Rendus*, Volume 113, page 551, and Volume 126, page 755; *Annales de Chimie et Physique*, Series 6, Volume 16, pages 236, 250, and Semmler's treatise on essential oils, (*Die Aetherischen Oele nach ihren Chemishen Bestandteilen*) Volume II, page 254.

The processes hitherto proposed are not adapted for technical application: (1) because they give poor yields; (2) because resinification, more particularly where acids of the fatty series are employed, occurs to a large extent; (3) because the by-products are difficult of utilization, and (4) because the resultant alcohols of the pentocean series do not consist of pure borneol and isoborneol, but contain a considerable quantity of admixed fenchyl alcohol, which on oxidation yields fencho derivatives and, in the manufacture of synthetic camphor, may have a deleterious effect.

In carrying out the present process, which largely avoids the specified difficulties, pinene is heated in an autoclave, with a slight excess of the theoretically-requisite quantity of an aromatic poly-substituted acid insoluble or difficultly soluble in water. The acids which do not fall under Victor Meyer's law of sterical hindrance for esterification are preferably employed. See *Berichte des Deutschen Chemischen Gesellschaft*, Vol. 27, 1894, pp. 510 and 1580; Vol. 28, 1895, pp. 182, 1254 and 1267. The principle of this law is that if one has to esterify an alcohol with aromatic acids it is better not to use for this purpose diortho-substituted acids, as these will not be esterified as well as the other acids. By using these acids a more favorable yield of borneol and isoborneol esters is obtained, the formation of fenchyl alcohol being almost entirely avoided, probably by reason of sterical impeding. To these acids a certain quantity of their anhydrids is preferably added, in order to increase the yield of borneols, these anhydrids acting on any water still present, retarding formation of the bodies of the hexagonal-ring systems. The use of anhydrids is also desirable, because these, as is well known, hydrate to acids and will therefore attract or absorb the water contained in the terpene oil, becoming converted into acids and thus still better dehydrating the pinene. The yield is also improved if instead of the anhydrid, or even in its presence, the acid chlorid of the respective acid is present in sufficient quantity, whereby also the reaction is accelerated. Probably for the same reasons as with acid chlorid (formation of HCl), a small addition of pinene hydrochlorid acts favorably on the acceleration of the reaction and on the improvement of the yield. Ortho-substituted aromatic acids may also be employed for the reaction, so far as they form an exception to Victor Meyer's above mentioned law, *e. g.*, nitrophtalic 1, 2, 3, acid, (*Berichte der Deutschen Chem. Ges.* 34486, *Monatshefte f. Chemie*, 1900, 27787). The use of an inert gas under pressure, in the autoclave, also makes it possible to employ fatty acids and mono-substituted aromatic acids, the latter then giving favorable yields of borneol esters, usually more than 40%.

The quantity of acid necessary for the reaction is dependent on the constitution of the acid used, one molecule of pinene being employed and there being two molecular proportions of monovalent acid or one molecular proportion of bivalent acid taking part in the reaction, while the acid may be present in a slight excess. This calculation is in contradiction to the statements of French Patent No. 379,430, as according to Semmler's treatise, Volume II, page 61, two acid-hydrogen atoms must attach themselves to the pinene. The boiling point of the mixture of acid and pinene, including the anhydrid if used, is first ascertained, and the reaction is caused to take place at a temperature which lies slightly, say 10°—20° C., above that which the mixture of liquid had when beginning to boil. If the temperature is thus regulated, the splitting off of water from the isoborneol, with formation of camphene, is almost entirely prevented. After the charging and closing of the autoclave but before the heating, carbon dioxid or any other inert gas is forced in through a nozzle, in order to expel the air and to obtain a pressure exceeding atmospheric pressure. After heating, the mass is discharged from the autoclave, cooled, freed from the surplus acid, which crystallizes out, and the limonene driven off with steam. The remaining borneol ester and isoborneol ester are saponified with the calculated quantity of alkali or alkaline earth and the borneol or isoborneol afterward also driven off with steam, or the saponification-product is directly oxidized to camphor.

It is important to limit the reaction between the acid and pinene to the shortest possible time, because, the process being considered as an esterification of the terpene alcohols, the speed of esterification of the borneol is greater than that of all the other terpene alcohols here occurring (borneol, .011, isoborneol, .0077, terpineol, .00043), and if the reaction lasts longer, more of other alcohols may be formed and thus the yield of the borneol is decreased; also because there is a saving of fuel. The reduction of the time of the reaction is attained by increasing the pressure in the autoclave, whereby also the lessening in the production of other alcohols, more particularly fenchyl-alcohol, is effected. The reason is that, under otherwise identical conditions, the specifically heavier isomers are usually formed under pressure. Of the terpene alcohols mentioned, borneol has the greatest specific gravity (borneol 1.02, isofenchyl-alcohol .961, terpineol .931). Terpineol is here mentioned because the limonene forms by water splitting from the intermediately-formed terpineol.

The following is a specific example of the process:—Equi-molecular weights of pinene and of any poly-substituted organic aromatic acid, e. g., nitrophtalic acid 1, 2, 3, are mixed and introduced into an autoclave. Before heating the autoclave, carbon dioxid or any other indifferent gas is forced into it in order to expel the air and produce a pressure exceeding atmospheric, say ten atmospheres. Then the mixture is heated to the predetermined temperature for a time varying with the quantities reacting. For 1 kilogram of pinene, the time is about 5 to 7 hours. The reactions occurring are:—

$$C_{10}H_{16} + RCOOH = C_{10}H_{17} O \cdot COR$$
$$C_{10}H_{17}O \cdot CO \cdot R + NaOH = R \cdot COO \cdot Na + C_{10}H_{17}OH$$
$$R \cdot COO \cdot Na + H \cdot Ac = R \cdot COO \cdot H + Na \cdot Ac.$$

where R is an aromatic polysubstituted acid radical, and Ac is any inorganic strong acid radical, as for instance nitric acid. After heating, the mass is discharged. The acid which has not reacted is crystallized, and the oily liquid containing the formed borneol esters in limonene solution is treated with steam, whereby the limonene is carried off and the borneol esters remain. These esters are heated for an hour with the theoretical amount, or a slight excess, of a 20% alcoholic soda solution and the alcohol is driven off. After this saponification, the borneol is steamed off and the remaining liquid contains the salt of the aromatic acid. The acid can be precipitated by the calculated amount of inorganic acid.

Another and more specific example of the process is as follows:—385 gr. of 1.3.4 dichlorobenzoic acid, and 156 grs. of pinene are maintained throughout 6 hours at a temperature of 208° in an autoclave, in which $CO_2$ gas or any other neutral gas has been compressed through a special nozzle before the heating, in order to obtain at least 15 atmospheres pressure. This pressure is maintained through the whole time of the reaction. After cooling, the resulting mass is pressed; the oily product which is obtained, contains the limonene and the bornyl ester of 1.3.4 dichlorobenzoic acid; the limonene is driven off with steam, and the ester saponified with a little excess over the theoretical quantity of alcoholic potash solution. Then the borneol is also driven off with steam, and from the residual potassium salt solution the acid which entered the reaction is precipitated by addition of the theoretical quantity of sulfuric or hydrochloric acid, dried, and can be used again in the process.

I claim:

1. The process of effecting the hydration of pinene to borneol and producing borneol and isoborneol esters from pinene which consists in introducing the latter with an organic acid into an autoclave, forcing an indifferent gas therein in order to form preliminarily a very high pressure, and, after the forcing in of said gas, heating the mixture to a temperature slightly higher than that at which the mixture begins to boil, so as to maintain or increase the pressure and to obtain a much higher pressure than the mass could have attained by being heated alone in the autoclave.

2. The process of effecting the hydration of pinene to borneol and producing borneol and isoborneol esters from pinene which consists in introducing equimolecular weights of pinene and a polysubstituted organic aromatic acid into an autoclave, forcing an indifferent gas into the autoclave to expel the air and produce a pressure exceeding atmospheric, and, after the introduction of the indifferent gas, heating the mixture to a temperature slightly higher than that at which it begins to boil, so as to maintain or increase the pressure and to keep it at a pressure higher than that which the mixture could have attained by the heat alone in the autoclave.

In witness whereof, I subscribe my signature, in presence of two witnesses.

GÉZA AUSTERWEIL.

Witnesses:
H. C. COXE,
MAX HERZENBERG.